F. T. MOYER.
SCARIFIER.
APPLICATION FILED OCT. 26, 1915.
1,195,387.
Patented Aug. 22, 1916.
3 SHEETS—SHEET 3.
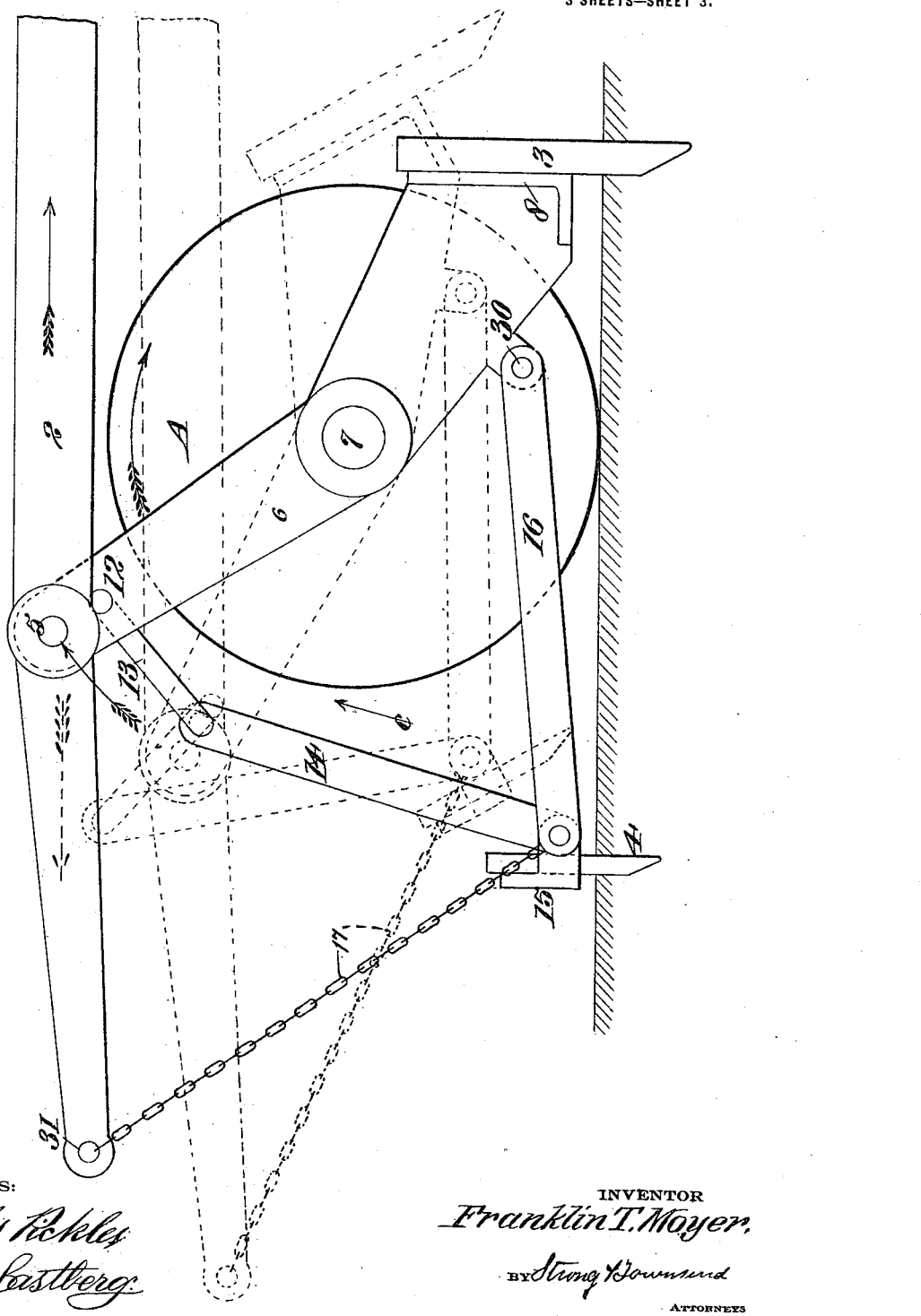
WITNESSES:
Charles Rickles
Thos Castberg
INVENTOR
Franklin T. Moyer.
BY Strong & Townsend
ATTORNEYS

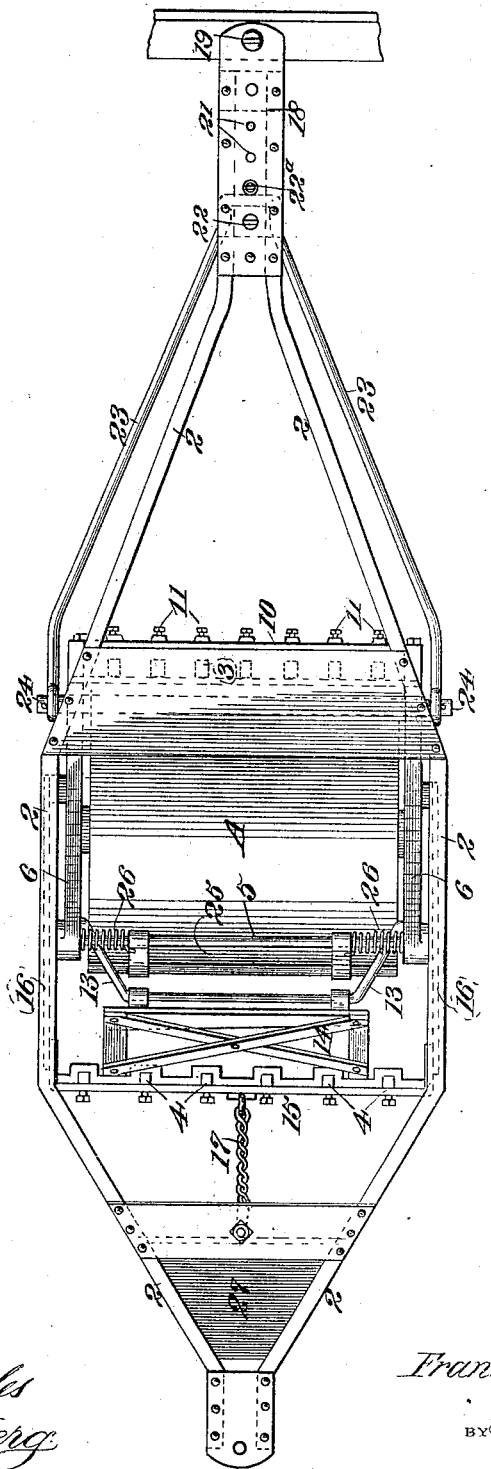

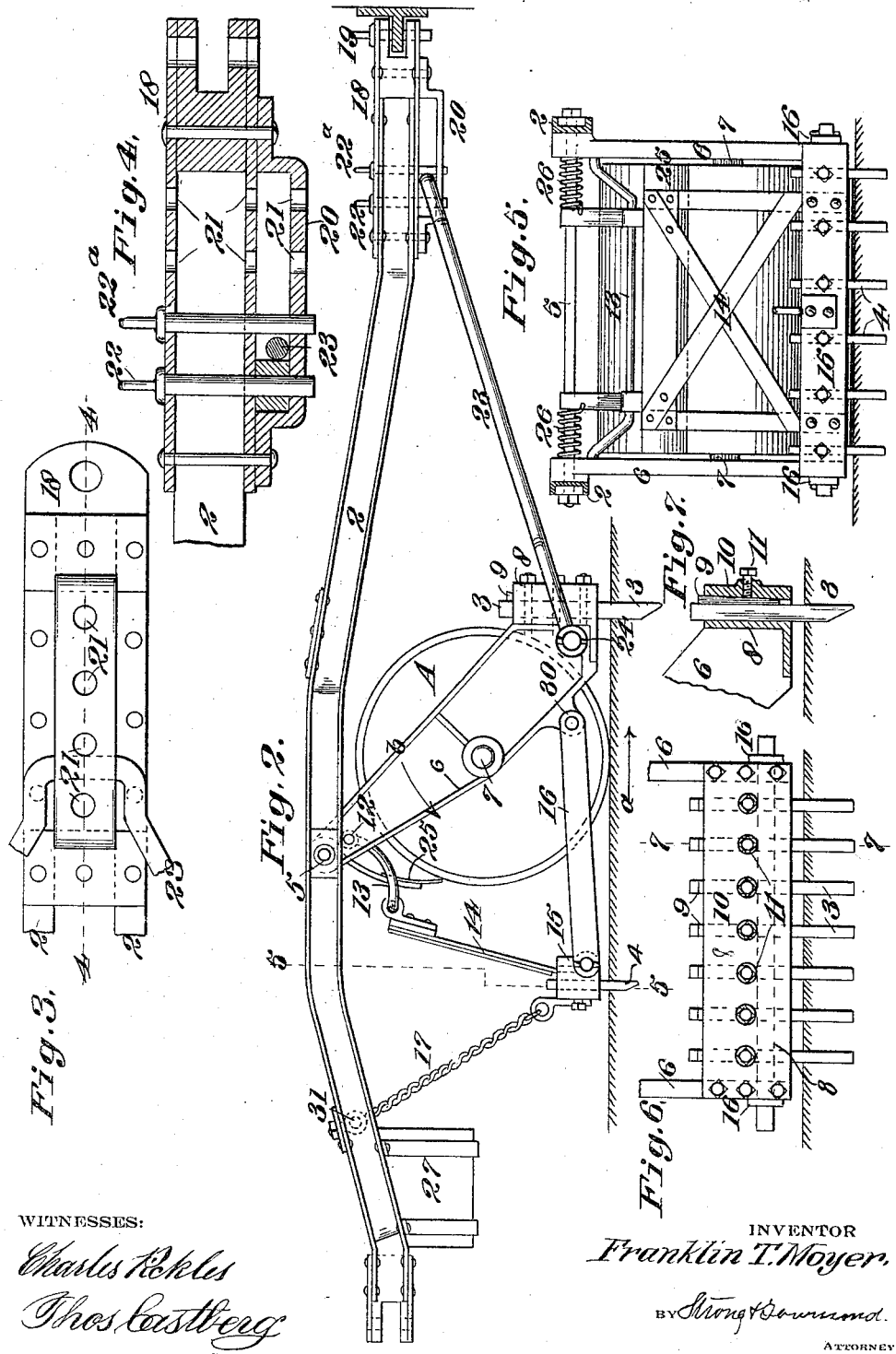

UNITED STATES PATENT OFFICE.

FRANKLIN T. MOYER, OF NAPA, CALIFORNIA.

SCARIFIER.

1,195,387.

Specification of Letters Patent.

Patented Aug. 22, 1916.

Application filed October 26, 1915. Serial No. 57,963.

*To all whom it may concern:*

Be it known that I, FRANKLIN T. MOYER, a citizen of the United States, residing at Napa, in the county of Napa and State of California, have invented new and useful Improvements in Scarifiers, of which the following is a specification.

This invention relates to a road scarifier for breaking up old road surfaces preparatory to relaying with macadamized, oiled or bituminous surfaces, brick, etc.

One of the objects of the present invention is to provide a simple, substantial, practical road scarifier consisting of a frame which is adjustably supported on a weighted roller.

It further consists of two sets of tines, one set placed in front of the roller to do the preliminary heavy breaking, and the other lighter set in the rear to complete the operation.

The scarifier is particularly designed to be pulled by a tractor and another object of the invention is to provide means whereby the power of the tractor may be utilized to raise and lower the tines to adjust the depth of same, or to lift them entirely free from the road surface.

The invention consists of the parts and the construction and combination of parts as hereinafter more fully described and claimed, having reference to the accompanying drawings, in which—

Figure 1 is a plan view of the machine. Fig. 2 is a side elevation of the same. Fig. 3 is an enlarged plan view of the forward end of the frame. Fig. 4 is a vertical section on line 4—4, Fig. 3. Fig. 5 is a cross section on line 5—5, Fig. 2. Fig. 6 is a detail front elevation of the bar that supports the forward tines. Fig. 7 is a cross section on line 7—7, Fig. 6. Fig. 8 is a diagrammatic view showing the tines lowered and elevated.

Referring to the drawings in detail, A indicates a weighted roller; 2 a channel iron frame; 3 a forward set of tines of heavy construction provided for the purpose of accomplishing the preliminary heavy breaking of the road surface; and 4 a rear set of lighter tines to complete the breaking action. The main frame of the machine, indicated at 2, is pivotally supported on a shaft 5, which extends between a pair of arms 6, one on each side of the roller. These arms are pivotally mounted on a shaft 7 which extends through the roller and are not only provided for the purpose of supporting the main frame, but also for the purpose of supporting the forward tines 3. A cross bar 8 secures the forward lower ends of the arms 6 forming a rigid connection between same, and this cross bar is primarily provided as a support for the tines 3. The tines may be secured in any suitable manner but preferably by means of wedges 9, interposed between the main bar 8 and the front plate 10; said wedges being secured by set screws 11, one for each wedge and connected tine.

Pivotally mounted as at 12, between the upper ends of the arms 6 at a point just below the bearing shaft 5 is a yoke shaft 13, and suspended from said yoke shaft by means of a frame 14, see Figs. 2 and 5, is a second cross bar 15, which is provided for the purpose of carrying the rear tines 4. These tines are of a lighter construction than the forward tines and may be secured to the cross bar by means of wedges and set screws, as previously described. Forming a connection between the cross bar 15 and each arm 6 is a draw-bar link 16, and supporting the cross bar 15 and links 16 with relation to the frame to regulate the position of the tines 4 is a chain 17. The forward end of the main frame 2 is provided with a draw bar head 18, the forward end of which is suitably constructed to permit the frame to be coupled to a tractor by means of a coupling 19. Secured on the lower side of the draw bar head 18 is a yoke-shaped slide 20. This, together with the head 18, is provided with a plurality of alined openings 21 through which bolts 22 may be inserted. Passing through the yoke-shaped slide 20 is the main draw-bar link 23, which is fork-shaped and so positioned as to permit its inner ends to be attached to the cross bar 8 as at 24, or the lower ends of the arm 6. The frame is otherwise provided with a scraper 25 of suitable construction, which is normally held in engagement with the roller by means of coil springs 26 and for the purpose of balancing the frame the counterweight, such as shown at 27, is provided.

The machine employed in the present instance is particularly designed for breaking up old road surfaces, preparatory to relaying with macadam, oiled or bituminous surfaces. The breaking up of old road surfaces when repairing the road, or repaving it by a machine constructed as here shown, is of great importance as it not only cuts and destroys the hard crust of the old material, but it also tears out the old stones which may be raked together to form the ground of the new surface. Very little fresh stone added will readily bond with the old under the roller and will thus give finish and strength to the new crust at a considerably reduced cost.

In operation with the frame coupled to a tractor or like device, and with movement in direction of the arrow, it will be seen that the front tines 3 will readily enter the hard crust of the road surface and break it up. The breaking action of these tines leaves the material in a lumpy, coarse condition and one object of the present invention is to crush and break the coarse material by the weighted roller A, as this passes over the material directly after it has been broken by the tines 3. The passage of the roller not only crushes the coarser particles but also re-rolls the road tending to smooth it out. It is therefore necessary to employ the rear tines 4 to re-loosen the material which has been partly packed by the roller A. A finely granulated smooth road surface is thus produced by the passage of the machine, and the road surface is ready to receive additional rock or material for re-paving purposes.

Another important feature of the present machine is the ready manner in which the tines may be adjusted to raise or lower same with relation to the road surface. If it is desired to decrease the depth of the tines it is only necessary to move the forward bolt 22ᵃ to the alined holes indicated at 21. The tractor is then backed up causing the frame to swing about the bearing shaft 5 and the roller shaft 7. This forces the main draw bar 23 forward in the yoke slide 20 until it engages the bolt 22ᵃ and it also causes the arms 6 to swing about shaft 7 in the direction of arrow b. This causes the main frame 2 to be lowered and the tines 3 to be raised. By referring to Fig. 8 it will be seen that the tines may be entirely raised from the road surface or their depth may be regulated by the position of the bolts 22 and 22ᵃ. Swinging movement of the arms 6 about shaft 7 permits the adjustment described. By referring to Figs. 2 and 8 it will be seen that the rear tines are raised and lowered in unison with the forward tines. This is caused by the chain 17 and the draw links 16. As the lower ends of the arms 6 are moved forward and upward it will be seen that the distance between the points 30 and 31 is increased. The increase in distance between these points tends to straighten out links 16 and chain 17 and will consequently lift cross bar 15, together with connected frame 16 and yoke shaft 13 in the direction of arrow C, to the dotted line position shown in Fig. 8; the distance lifted being regulated by the position of bolts 22 and 22ᵃ.

The flexible mounting of the scraper 25 permits this to remain in contact with the face of the roller whether in one position or another and is therefore not effected by the raising or lowering of the tines, as described.

From the foregoing description it will be seen that the tearing up or scarifying of the old road surface is first accomplished by a plurality of heavy powerful tines. As these break up the high projections entirely and in a lesser degree loosen the lower parts or pot-holes, the result is that the irregularities of the surface are reduced to a uniform bed over which the roller passes to crush the coarser particles and also to smooth out the irregularities left by the breaking action of the forward tines. The final passage of the rear tines tears the surface just enough to permit a perfect bond between the new and old material with which the road is to be surfaced. Moreover, the new stone or material when embedded in the surface prepared as described, is not so readily crushed or scattered in the process of rolling, but is pressed into the loosened material when whole and thus conserves its best wearing qualities. While the tines in the present instance are shown as vertically disposed, it is obvious that the angles of same are set, or may be varied, as expert road builders find necessary, according to the nature and hardness of the material to be scarified. The tines may be set any distance apart and preferably in zig-zag position with relation to each other.

The materials and finish of the several parts of the machine may otherwise be such as experience and judgment of the manufacturer may dictate.

Having thus described my invention, what I claim and desire to secure by Letters Patent is—

1. In a road sacrifier, the combination of a roller, a pair of arms pivotally mounted on the roller, a frame pivotally supported on the upper ends of said arms, a cross-bar connecting the lower ends of said arms in front of the roller, a plurality of tines secured on the cross-bar, a draw-bar connecting the cross-bar with the forward end of the frame, a second cross-bar positioned rearwardly of the roller, a plurality of tines secured on the second cross-bar, links connecting said second cross-bar with the arms, and means for suspending said links and connected cross-bar from the frame.

2. In a road scarifier, the combination of a roller, a pair of arms pivotally mounted on the roller, a frame pivotally supported on the upper ends of said arms, a cross-bar connecting the lower ends of said arms in front of the roller, a plurality of tines secured on the cross-bar, a draw-bar connecting the cross-bar with the forward end of the frame, a second cross-bar positioned rearwardly of the roller, a plurality of tines secured on the second cross-bar, links connecting said second cross-bar with the arms, and a chain for suspending said links and connected cross-bar from the frame.

3. In a road scarifier, the combination of a roller, a pair of arms pivotally mounted on the roller, a frame pivotally supported on the upper ends of said arms, a cross-bar connecting the lower ends of said arms in front of the roller, a plurality of tines secured on the cross-bar, a draw-bar connecting the cross-bar with the forward end of the frame, a second cross-bar positioned rearwardly of the roller, a plurality of tines secured on the second cross-bar, links connecting said second cross-bar with the arms, means for suspending said links and connected cross-bar from the frame, and means for adjustably securing the draw-bar to the frame.

4. In a road scarifier, the combination of a roller, a pair of arms pivotally mounted on the roller, a frame pivotally supported on the upper ends of said arms, a cross-bar connecting the lower ends of said arms in front of the roller, a plurality of tines secured on the cross-bar, a draw-bar connecting the cross-bar with the forward end of the frame, a second cross-bar positioned rearwardly of the roller, a plurality of tines secured on the second cross-bar, links connecting said second cross-bar with the arms, a chain for suspending said links and connected second cross-bar from the frame, and means for adjustably securing the draw bar to the frame.

5. In a road scarifier, the combination of a roller, a pair of arms positioned one on each side of the roller, a shaft extending through the roller and the arms to support the arms and to permit a pivotal movement of the arms with relation to the roller, a shaft extending through the upper ends of the arms and connecting the same, a frame pivotally mounted at its rear end on said shaft, a cross bar connecting the lower ends of the arms, a plurality of tines secured on the cross-bar, and a draw-bar connecting the cross-bar with the forward end of the frame.

6. In a road scarifier, the combination of a roller, a pair of arms, one on each side of the roller, and pivotally mounted thereon, a frame connecting the upper ends of the arms and pivotally attached to same; a cross-bar connecting the lower ends of the arms; a plurality of tines secured on the cross-bar; a draw-bar connecting the cross-bar to the forward end of the frame and means for adjustably securing the draw-bar to the frame.

7. In a road scarifier, the combination of a roller, a pair of arms, one on each side of the roller, and pivotally mounted thereon; a frame connecting the upper ends of the arms and pivotally attached to same; a cross-bar connecting the lower ends of the arms; a plurality of tines secured on the cross-bar and a V-shaped draw-bar having its forward end adjustably secured to the forward end of the frame, and having its rear separated ends pivotally attached to the cross-bar.

In testimony whereof I have hereunto set my hand in the presence of two subscribing witnesses.

FRANKLIN T. MOYER.

Witnesses:
AGNES W. DOWNEY,
CLARENCE N. RIGGINS.

Copies of this patent may be obtained for five cents each, by addressing the "Commissioner of Patents, Washington, D. C."